(12) United States Patent
Lin et al.

(10) Patent No.: US 7,563,013 B2
(45) Date of Patent: Jul. 21, 2009

(54) LIGHT GUIDE PLATE

(75) Inventors: Chih-Tsung Lin, Taichung (TW); Tzu-Wen Su, Taichung (TW)

(73) Assignee: Jeng Shiang Precision Ind. Co., Ltd., Taichung (TW)

( * ) Notice: Subject to any disclaimer, the term of this patent is extended or adjusted under 35 U.S.C. 154(b) by 134 days.

(21) Appl. No.: 11/784,828

(22) Filed: Apr. 9, 2007

(65) Prior Publication Data
US 2007/0285946 A1 Dec. 13, 2007

(30) Foreign Application Priority Data
Jun. 7, 2006 (TW) .............................. 95120231 A

(51) Int. Cl.
*F21V 7/04* (2006.01)
(52) U.S. Cl. ................. 362/620; 362/626; 362/615; 362/612
(58) Field of Classification Search ................. None
See application file for complete search history.

(56) References Cited
U.S. PATENT DOCUMENTS

| | | | | |
|---|---|---|---|---|
| 6,454,452 B1 * | 9/2002 | Sasagawa et al. | ........... | 362/561 |
| 6,609,809 B2 * | 8/2003 | Ohkawa | ........... | 362/626 |
| 6,755,546 B2 * | 6/2004 | Ohkawa | ........... | 362/626 |
| 6,836,303 B2 * | 12/2004 | Kim | ........... | 349/65 |
| 6,986,600 B2 * | 1/2006 | Yamada et al. | ........... | 362/626 |
| 7,220,026 B2 * | 5/2007 | Ko et al. | ........... | 362/339 |
| 2003/0123245 A1 * | 7/2003 | Parker et al. | ........... | 362/31 |
| 2004/0114346 A1 * | 6/2004 | Parker et al. | ........... | 362/31 |
| 2006/0133113 A1 * | 6/2006 | Koike et al. | ........... | 362/626 |

\* cited by examiner

*Primary Examiner*—Bao Q Truong
*Assistant Examiner*—Danielle Allen
(74) *Attorney, Agent, or Firm*—Banger Shia

(57) ABSTRACT

A light guide plate is adapted for use with at least one light source that is capable of providing source light beams. The light guide plate includes a plate body, and a plurality of light-guiding structures that are distributed on the plate body. Each of the light-guiding structures is in a substantially quadrilateral pyramidal form, and includes a quadrilateral lower end that has four corners, and a tapered upper end that is disposed opposite to the lower end. Each of the light-guiding structures further includes four sides, each of which is defined by the upper end and a corresponding adjacent pair of the corners, adjacent ones of the sides being interconnected.

11 Claims, 9 Drawing Sheets

LIGHT GUIDE PLATE

CROSS-REFERENCE TO RELATED APPLICATION

This application claims priority of Taiwanese Application No. 095120231, filed on Jun. 7, 2006.

BACKGROUND OF THE INVENTION

1. Field of the Invention

The invention relates to a light guide plate, more particularly to a light guide plate including a plurality of light-guiding structures.

2. Description of the Related Art

A conventional light guide plate utilizes total internal reflection to make light beams provided by a light source propagate from a first edge surface of the light guide plate to a second edge surface of the light guide plate opposite to the first edge surface. Since the light guide plate is provided for distributing the light beams to form a surface light source, where light beams exit the light guide plate from a light-exit surface, a bottom surface of the light guide plate opposite to the light-exit surface is normally etched with a plurality of light-reflecting dots such that light beams encountering these light-reflecting dots are diffused and reflected out through the light-exit surface.

The light-reflecting dots etched on the bottom surface of the abovementioned conventional light guide plate are capable of changing the direction of propagation of light beams so as to form the surface light source. However, distribution of the light-reflecting dots on the bottom surface and the sizes of the light-reflecting dots are not uniform such that the light beams are diffused unevenly, resulting in a relatively large loss of energy and poor light uniformity. Therefore, a bottom surface and a top surface of a modified conventional light guide plate are usually formed with V-shaped grooves arranged uniformly to reduce the loss of energy. An example of the modified conventional light guide plate is illustrated in FIG. 1 and FIG. 2. A light source 1 is disposed at a side of the modified conventional light guide plate, and is capable of providing light beams to the light guide plate. The modified conventional light guide plate includes a plate body 2 having a first surface formed with a plurality of first V-shaped grooves 3, each of which extends in a first direction. The plate body 2 further has a second surface opposite to the first surface and formed with a plurality of second V-shaped grooves 4, each of which extends in a second direction perpendicular to the first direction. For a 2-inch modified conventional light guide plate with a space of 0.1 mm between each adjacent pair of the first V-shaped grooves 3 and the second V-shaped grooves 4, there are approximately 300 first V-shaped grooves 3 and approximately 400 second V-shaped grooves 4.

Although the first and second V-shaped grooves 3, 4 are capable of diffusing the light beams such that the light beams exiting the modified conventional light guide plate have angles falling within a 30 degree range relative to a normal of the light guide plate, the following shortcomings are still present:

1. Since the first and second V-shaped grooves 3, 4 form elongated structures respectively on the first and second surfaces, minor adjustments on local areas where optical characteristics are relatively poor cannot be provided thereby. For instance, luminance of the light beams exiting the light guide plate is higher for regions of the modified conventional light guide plate proximate to the light source 1 than regions distal from the light source 1. However, the elongated structures formed by the first and second V-shaped grooves 3, 4 cannot provide further enhancement to the regions with poor luminance. Consequently, the luminance of light beams exiting the modified conventional light guide plate is not uniform.

2. The molds for forming the first and second V-shaped grooves 3, 4 require highly precise cutting finish. Since the structures formed by the first and second V-shaped grooves 3, 4 are elongated, the machining of the molds become more difficult, thereby increasing manufacturing cost.

3. Since the structures formed by the first and second V-shaped grooves 3, 4 are elongated, forming the light guide plate by injection molding can result in a high failure rate. In addition, the elongated structures are easily scratched during transport, thereby resulting in a high damage rate.

SUMMARY OF THE INVENTION

Therefore, the object of the present invention is to provide a light guide plate that is capable of guiding light uniformly, that has a low manufacturing cost, a high production yield, and a low damage rate.

According to the present invention, there is provided a light guide plate that is adapted for use with at least one light source capable of providing source light beams. The light guide plate includes a plate body, and a plurality of light-guiding structures that are distributed on the plate body. Each of the light-guiding structures is in a substantially quadrilateral pyramidal form, and includes a quadrilateral lower end that has four corners, and a tapered upper end that is disposed opposite to the lower end. Each of the light-guiding structures further includes four sides, each of which is defined by the upper end and a corresponding adjacent pair of the corners, adjacent ones of the sides being interconnected.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
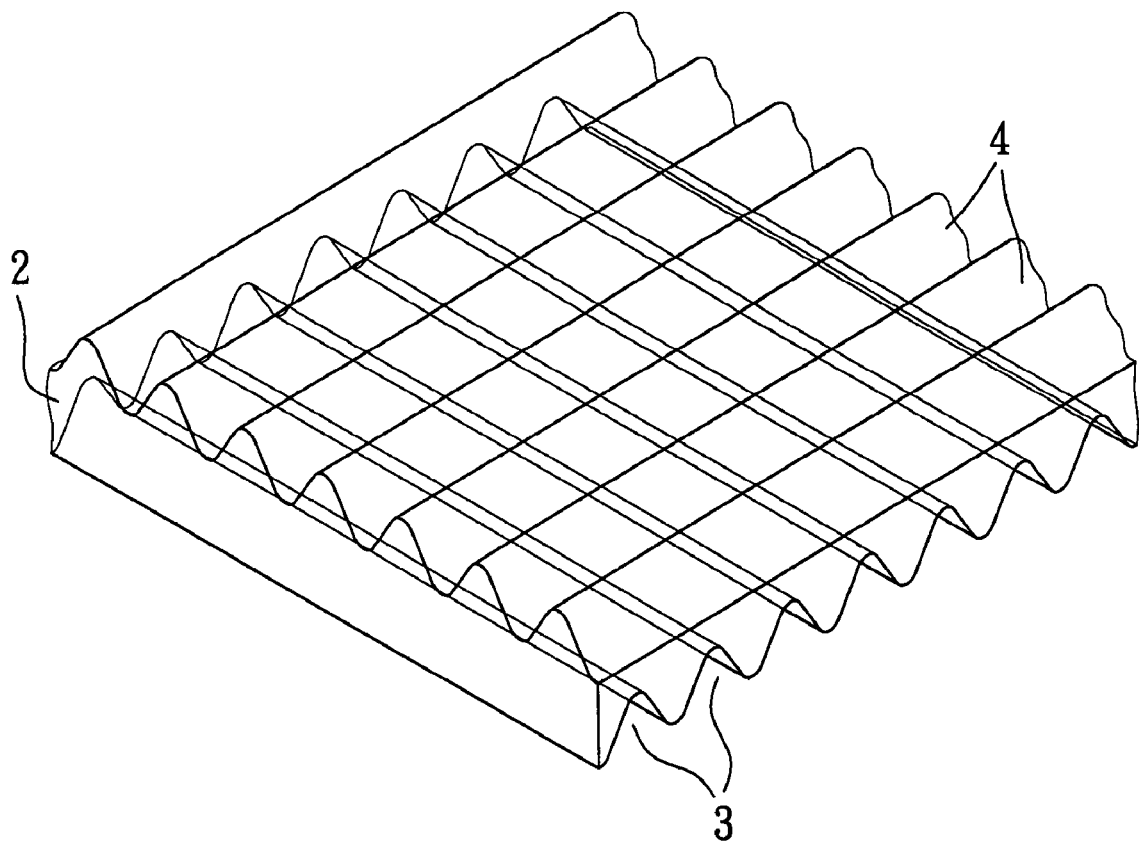
FIG. 1 is a perspective view of a modified conventional light guide plate.
Figure 2:
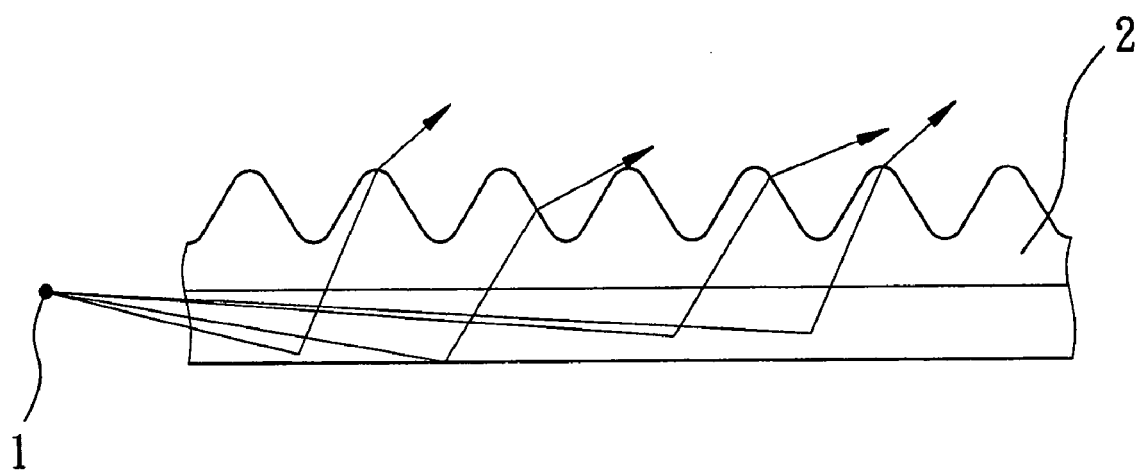
FIG. 2 is a front schematic view of the modified conventional light guide plate, illustrating optical paths of light beams propagating therethrough.

Before the present invention is described in greater detail, it should be noted herein that like elements are denoted by the same reference numerals throughout the disclosure.

Figure 3:
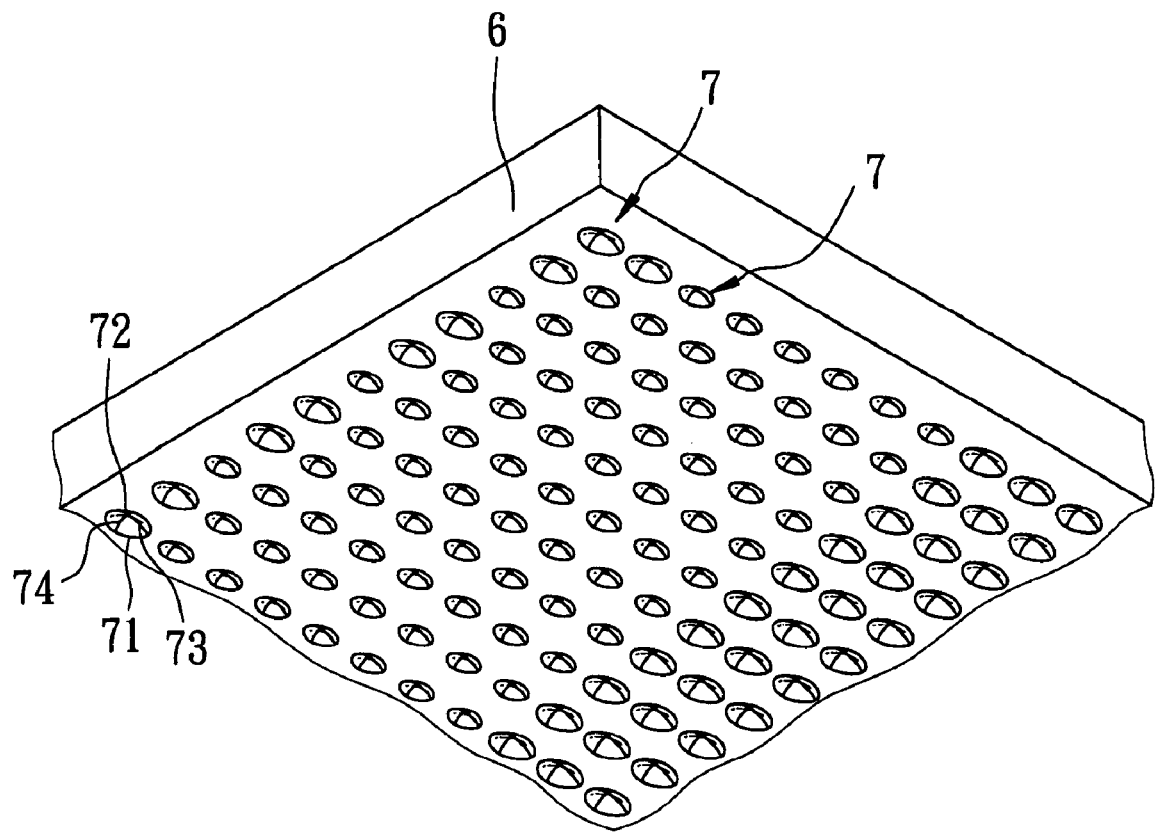
FIG. 3 is a fragmentary bottom perspective view of the first preferred embodiment of a light guide plate according to the present invention.
Figure 4:
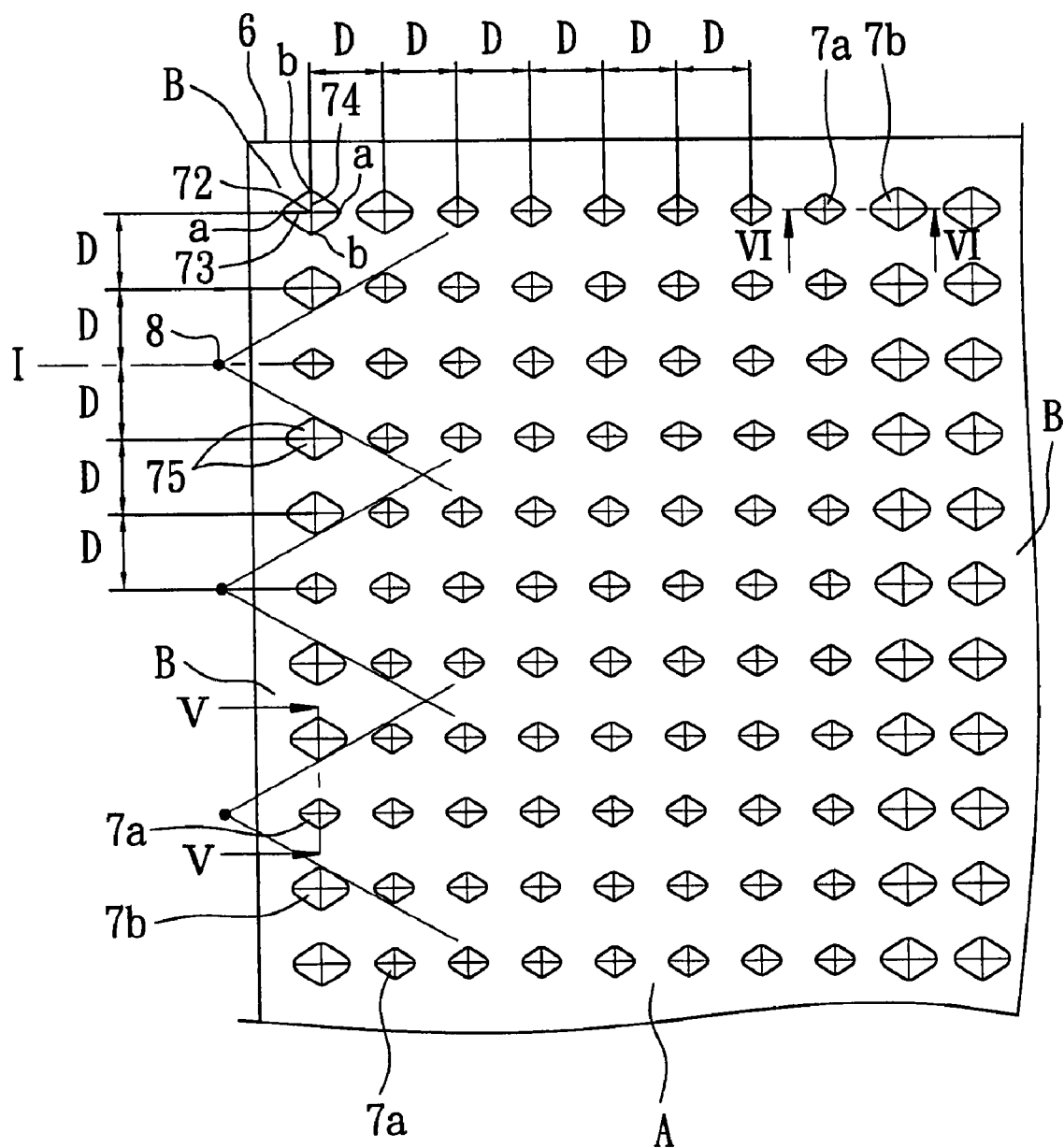
FIG. 4 is a bottom schematic view of the first preferred embodiment.

As shown in FIG. 3 and FIG. 4, the first preferred embodiment of a light guide plate according to the present invention includes a plate body 6 and a plurality of light-guiding structures 7. The light guide plate is adapted for use with at least one light source 8 that is capable of providing source light beams, and that defines a light-emitting axis (I).

The light-guiding structures 7 are distributed on the plate body 6. Each of the light-guiding structures 7 is in a substantially quadrilateral pyramidal form, and includes a quadrilateral lower end 71 that has four corners (a), (b), and a tapered upper end 72 that is disposed opposite to the lower end 71. A first pair of the corners (a) is aligned in the direction of the light-emitting axis (I), and a second pair of the corners (b) is aligned in the direction of the light-emitting axis (I). Each of the light-guiding structures 7 further includes four sides 75, each of which is defined by the upper end 72 and a corresponding adjacent pair of the corners (a), (b). Adjacent ones of the sides 75 are interconnected. In this embodiment, the lower end 71 is rhombus shaped, and the light-guiding structures 7 are distributed in a matrix on the plate body 6.

Each of the light-guiding structures 7 has a first boundary edge 73 connecting the first pair of the corners (a) and extending to the upper end 72, and a second boundary edge 74 connecting the second pair of the corners (b) and crossing the first boundary edge 73 at the upper end 72. The first boundary edge 73 extends in a plane parallel to the light-emitting axis (I) of the light source 8, and the second boundary edge 74 extends in a plane parallel to the light-emitting axis (I). Each of the light-guiding structures 7 is symmetrical relative to the first and second boundary edges 73, 74.

Figure 5:
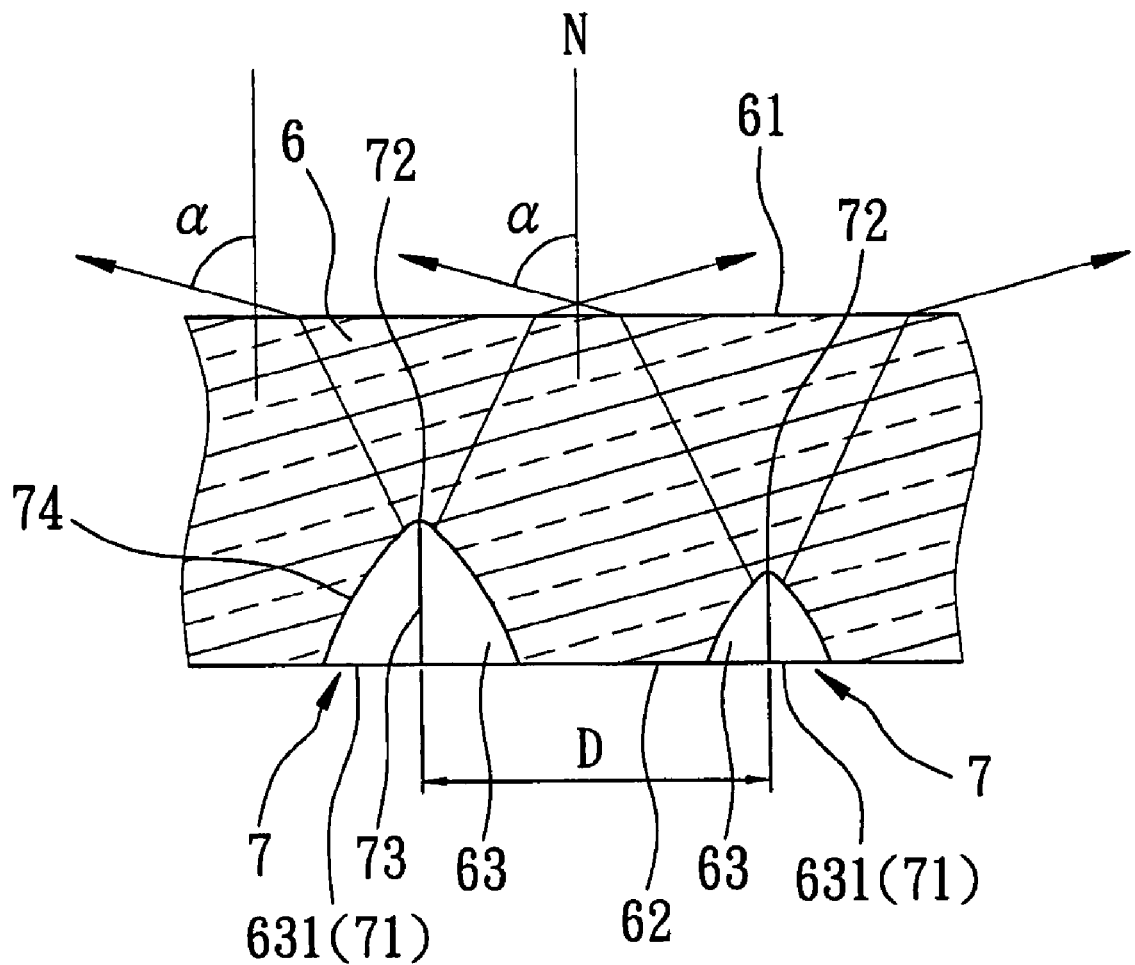
FIG. 5 is a sectional view of the first preferred embodiment taken along line V-V in FIG. 4, illustrating optical paths of light beams propagating through the light guide plate.

With further reference to FIG. 5, in this embodiment, the plate body 6 includes opposite upper and lower sides 61, 62, and is formed with a plurality of grooves 63 extending from the lower side 62 toward the upper side 61. Each of the grooves 63 is in a substantially quadrilateral pyramidal form, and has a quadrilateral opening 631 at the lower side 62. Each of the grooves 63 serves as a corresponding one of the light-guiding structures 7 with the opening 631 defining the lower end 71 of the corresponding one of the light-guiding structures 7, and is defined by the four sides 75 and the tapered upper end 72 of the corresponding one of the light-guiding structures 7. The light-guiding structures 7 are equidistantly spaced in the matrix in such a manner that geometric centers of adjacent pairs of the light-guiding structures 7 are spaced part from each other by a distance (D). In a 2 inch light guide plate, and with distance (D) equal to 0.1 mm, there are approximately 120,000 (300×400) light-guiding structures 7.

As shown in FIG. 4 and FIG. 5, the source light beams provided by the light source 8 enter the light guide plate through a left (as defined by FIG. 4) side edge thereof that interconnects the upper and lower sides 61, 62. The light-guiding structures 7 are capable of changing optical paths of light beams propagating through the light guide plate such that the light beams exit the light guide plate with angles ($\alpha$) relative to a normal (N) of the upper side 61 of the plate body 6 that fall within a predefined range. In particular, the predefined range is between 55 to 75 degrees. In addition, the plurality of light-guiding structures 7 include a plurality of small light-guiding structures 7a disposed at parts (A) of the plate body 6 where the amount of the source light beams provided by the light source 8 impinging thereupon is large (e.g., parts of the plate body 6 disposed proximate to the light source 8), and a plurality of large light-guiding structures 7b sized larger than the small light-guiding structures 7a, and disposed at parts (B) of the plate body 6 where the amount of the source light beams impinging thereupon is small (e.g., parts of the plate body 6 disposed distal from the light source 8).

Figure 6:
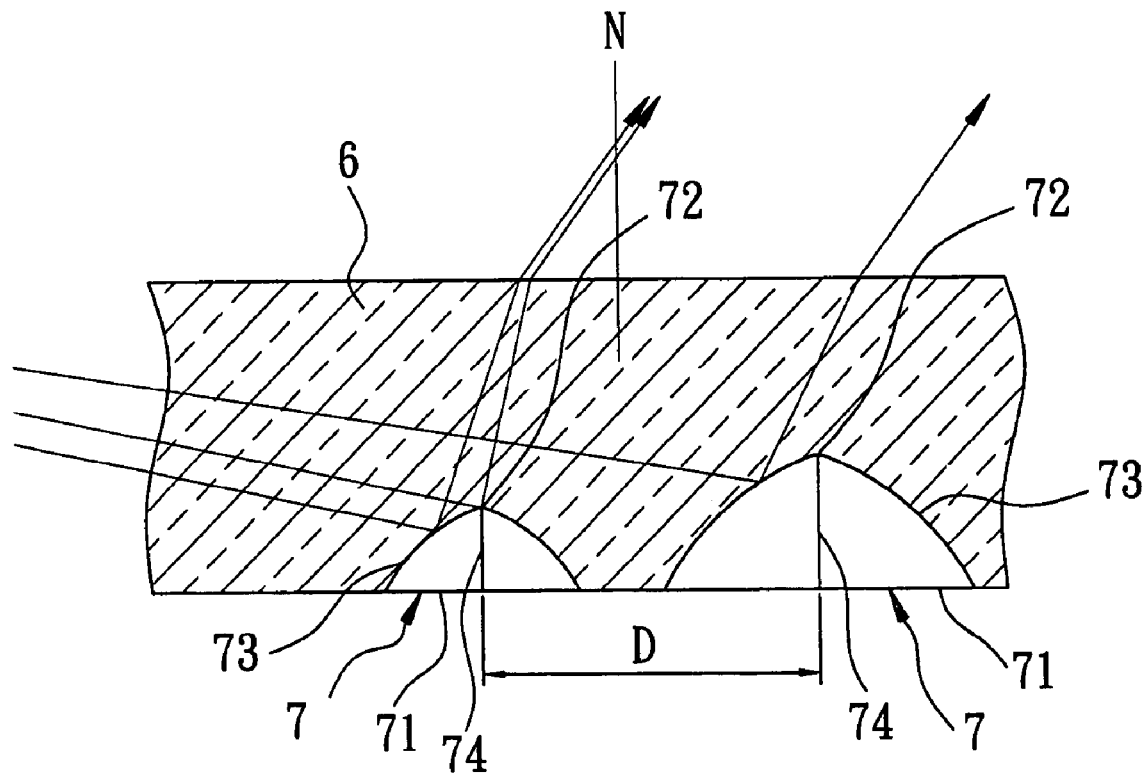
FIG. 6 is a sectional view of the first preferred embodiment taken along line VI-VI in FIG. 4, illustrating optical paths of light beams propagating through the light guide plate.
Figure 7:
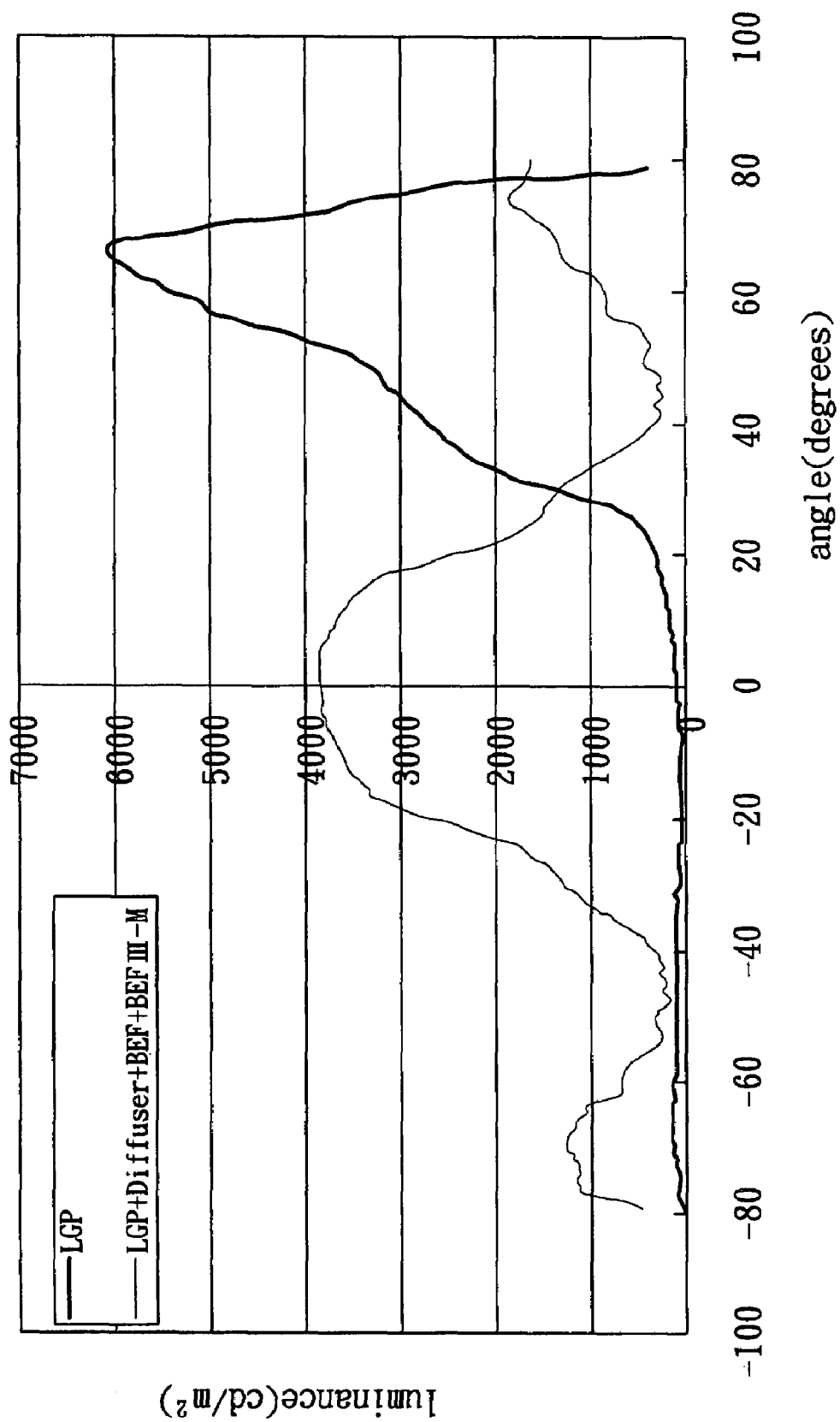
FIG. 7 is a plot illustrating result of a luminance measurement conducted for the first preferred embodiment.

Referring to FIG. 6 and FIG. 7, the direction of the normal (N) of the upper side 61 of the plate body 6 is defined to be zero degrees, and the upper side 61 extends toward the right of FIG. 6 in 90 degrees relative to the normal (N). An experiment was conducted to measure luminance at a center of the light guide plate of the first preferred embodiment along a plane that is parallel to the light-emitting axis (I) of the light source 8. The result of the luminance measurement is illustrated by the thick line in FIG. 7, where half-luminance light-emitting angles are concentrated within a 20 degree range (i.e., between 55 to 75 degrees relative to the normal (N)) with the greatest luminance being 6000 cd/m$^2$. It is thus evident that the concentration of the light beams exiting the light guide plate according to the present invention is better than the prior art, where light-emitting angles fall within a 30 degree range.

Figure 8:
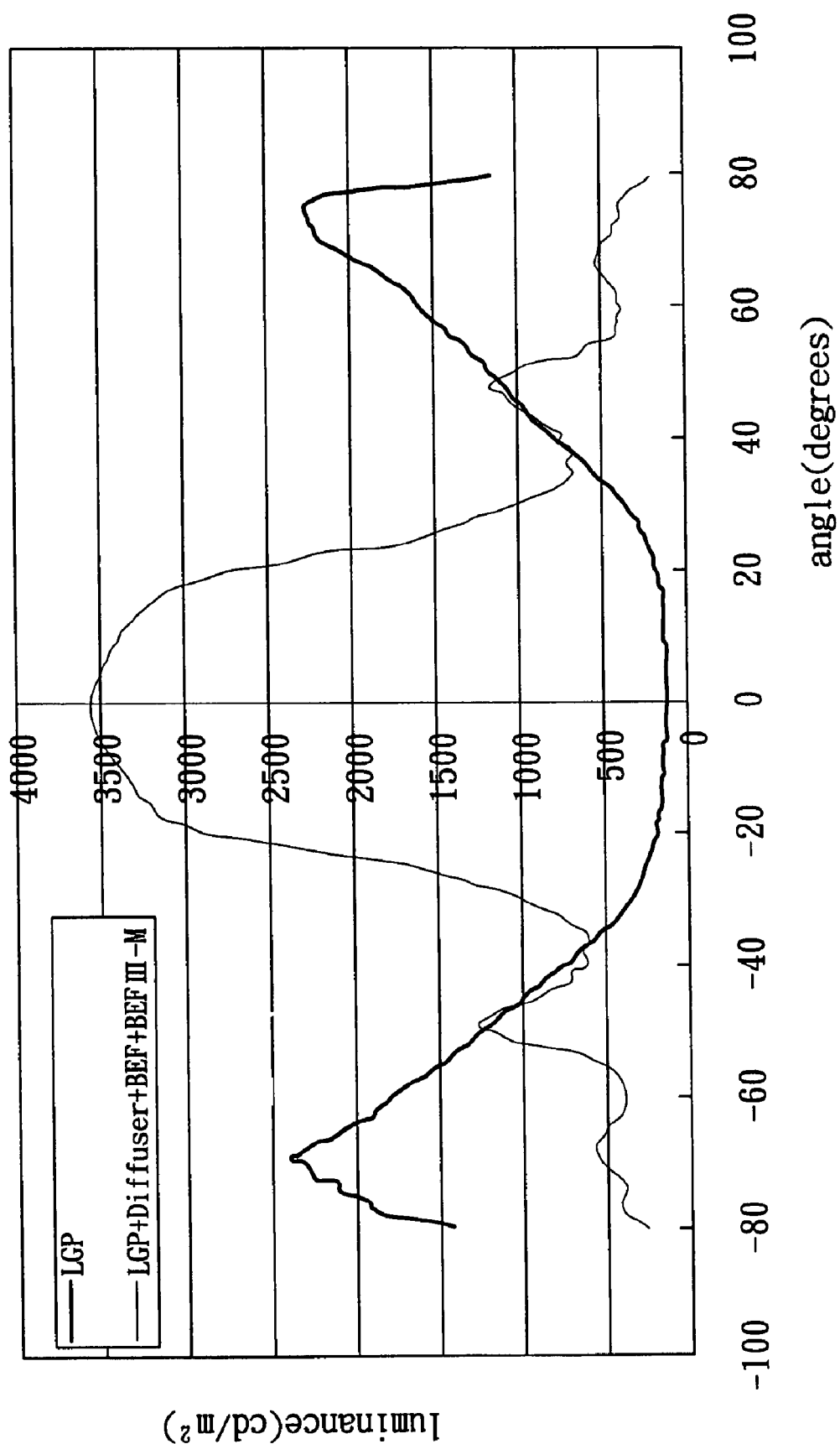
FIG. 8 is a plot illustrating result of another luminance measurement conducted for the first preferred embodiment.

Referring to FIG. 5 and FIG. 8, the direction of the normal (N) of the upper side 61 of the plate body 6 is defined to be zero degrees, and the upper side 61 extends toward the right of FIG. 5 in 90 degrees and toward the left in −90 degrees relative to the normal (N). An experiment was conducted to measure the luminance at the center of the light guide plate of the first preferred embodiment along a plane that is transverse to the light-emitting axis (I) of the light source 8. The result of the luminance measurement is illustrated by the thick line in FIG. 8, where the half-luminance light-emitting angles are concentrated within a 20 degree range (i.e., between 55 to 75 degrees relative to the normal (N), and between −55 to −75 degrees relative to the normal (N)).

It is evident that according to the present invention, the light beams exit the light guide plate with angles ($\alpha$) relative to the normal (N) that fall within the predefined range of between 55 and 75 degrees, which defines a relatively good luminance concentration. In addition, the thin lines in FIG. 7 and FIG. 8 represent luminance of the light beams exiting the light guide plate after being corrected with a diffuser and a 3M light condenser. It is obvious from the plots that the light beams exit the light guide plate with a high concentration in the direction of the normal (N) after correction.

Figure 9:
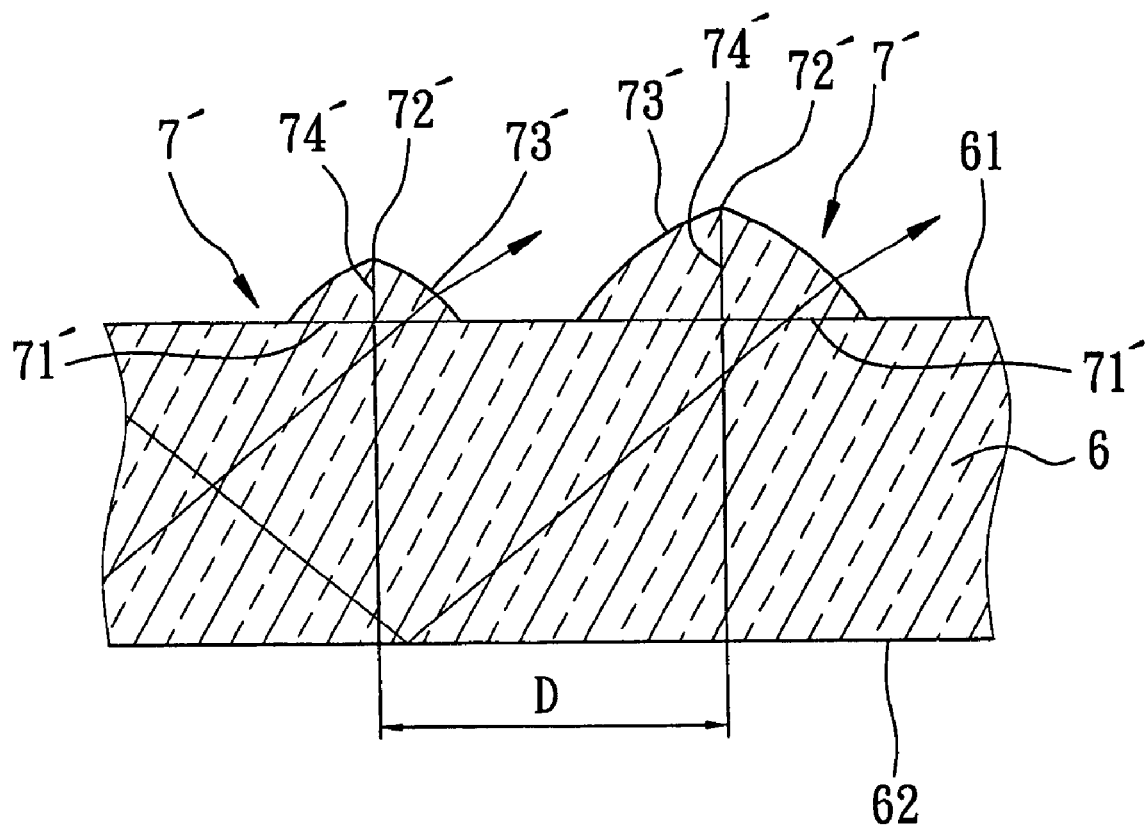
FIG. 9 is a fragmentary sectional view similar to FIG. 5, but illustrating the second preferred embodiment of a light guide plate according to the present invention.

As shown in FIG. 9, the second preferred embodiment of a light guide plate according to the present invention differs from the first preferred embodiment in the light-guiding structures 7'. The light-guiding structures 7' of the second preferred embodiment are disposed on the plate body 6 such that the quadrilateral lower end 71' of each of the light-guiding structures 7' is disposed on the upper side 61 of the plate body 6, and such that the tapered upper end 72' and the four sides 75' extend from the upper side 61 in directions away from the lower side 62 of the plate body 6. In this embodiment, the first and second boundary edges 73', 74' of each of the light-guiding structures 7' are disposed outside of the plate body 6. With light-guiding structures 7' so configured, the light-guiding structures 7' are still capable of changing the optical paths of light beams propagating through the light guide plate such that the light beams exit the light guide plate with angles ($\alpha$) relative to the normal (N) of the upper side 61 of the plate body 6 that fall within the predefined range of between 55 to 75 degrees.

In sum, the light guide plate according to the present invention has the following effects and advantages:

1. Since the light-guiding structures 7, 7' are distributed in a matrix, minor adjustments can be conducted so as to compensate for poor optical characteristics in local areas. For instance, small light-guiding structures 7a (as shown in FIG. 4) can be disposed at parts (A) of the plate body 6 where the amount of the source light beams provided by the light source 8 impinging thereupon is large (e.g., parts of the plate body 6 proximate to the light source 8), and large light-guiding structures 7b sized larger than the small light-guiding structures 7a can be disposed at parts (B) of the plate body 6 where the amount of the source light beams impinging thereupon is small (e.g., parts of the plate body 6 distal from the light source 8). Consequently, the light beams exiting the light guide plate of the present invention are uniformly distributed.

2. The mold for the light guide plate with the light-guiding structures 7, 7' is formed by precision casting. Due to the matrix distribution of the light-guiding structures 7, 7', failure rate in manufacturing the light guide plate is decreased drastically, thereby reducing the manufacturing cost of the light guide plate.

3. The matrix distribution of the light-guiding structures 7, 7' not only increases the production yield during injection molding of the light guide plate, but also reduces the possibility of the light-guiding structures 7, 7' from being scratched during transport of the light guide plate, thereby resulting in a lower damage rate.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A light guide plate adapted for use with at least one light source that is capable of providing source light beams, said light guide plate comprising:

a plate body; and a plurality of light-guiding structures that are distributed on said plate body, each of said light-guiding structures being in a substantially quadrilateral pyramidal form, and including a quadrilateral lower end that has four corners, and a tapered upper end that is disposed opposite to said lower end, each of said light-guiding structures further including four sides, each of which is defined by said upper end and a corresponding adjacent pair of said corners, adjacent ones of said sides being interconnected;

wherein said plate body includes opposite upper and lower sides, the source light beams provided by the light source entering said light guide plate through a side edge thereof that interconnects said upper and lower sides; and wherein said light-guiding structures are capable of changing optical paths of light beams propagating through said light guide plate such that the light beams exit said light guide plate with angles relative to a normal of said upper side of said plate body that fall within a predefined range;

wherein said predefined range is between 55 to 75 degrees to generate the greatest luminance of 6000 cd/m.sup.2 so as to concentrate the light beams which exits the light guide plate;

each of said light-guiding structures has a first boundary edge connecting a first pair of said corners and extending to said upper end, and a second boundary edge connecting a second pair of said corners and crossing said first boundary edge at said upper end, each of said light-guiding structures being symmetrical relative to said first and second boundary edges.

2. The light guide plate as claimed in claim 1, wherein said light-guiding structures are distributed in a matrix on said plate body.

3. The light guide plate as claimed in claim 2, wherein said light-guiding structures are equidistantly spaced in said matrix.

4. The light guide plate as claimed in claim 1, wherein said plurality of light-guiding structures include a plurality of small light-guiding structures disposed at parts of said plate body where the amount of the source light beams provided by the light source impinging thereupon is large, and a plurality of large light-guiding structures sized larger than said small light-guiding structures, and disposed at parts of said plate body where the amount of the source light beams impinging thereupon is small.

5. The light guide plate as claimed in claim 1, wherein said lower end of each of said light-guiding structures is rhombus shaped.

6. A light guide plate adapted for use with at least one light source that is capable of providing source light beams, said light guide plate comprising:

a plate body; and a plurality of light-guiding structures that are distributed on said plate body, each of said light-guiding structures being in a substantially quadrilateral pyramidal form, and including a quadrilateral lower end that has four corners, and a tapered upper end that is disposed opposite to said lower end, each of said light-guiding structures further including four sides, each of which is defined by said upper end and a corresponding adjacent pair of said corners, adjacent ones of said sides being interconnected;

wherein said plate body is formed with a plurality of grooves extending from said lower side toward said upper side, each of said grooves being in a substantially quadrilateral pyramidal form, and having a quadrilateral opening at said lower side, each of said grooves serving as a corresponding one of said light-guiding structures with said opening defining said lower end of the corresponding one of said light-guiding structures, and being defined by said four sides and said tapered upper end of the corresponding one of said light-guiding structures, and the source light beams provided by the light source entering said light guide plate through a side edge of said plate body that interconnects said upper and lower sides;

wherein said light-guiding structures are capable of changing optical paths of light beams propagating through said light guide plate such that the light beams exit said light guide plate with angles relative to a normal of said upper side of said plate body that fall within a predefined range;

wherein said predefined range is between 55 to 75 degrees to generate the greatest luminance of 6000 cd/m.sup.2 so as to concentrate the light beams which exits the light guide plate;

each of said light-guiding structures has a first boundary edge connecting a first pair of said corners and extending to said upper end, and a second boundary edge connecting a second pair of said corners and crossing said first boundary edge at said upper end, each of said light-guiding structures being symmetrical relative to said first and second boundary edges.

7. The light guide plate as claimed in claim 6, wherein said plate body includes opposite upper and lower sides, said light-guiding structures being disposed on said plate body such that said quadrilateral lower end of each of said light-guiding structures is disposed on said upper side, and such that said tapered upper end and said four sides extend from said upper side in directions away from said lower side.

8. The light guide plate as claimed in claim 6, wherein said light-guiding structures are distributed in a matrix on said plate body.

9. The light guide plate as claimed in claim 8, wherein said light-guiding structures are equidistantly spaced in said matrix.

10. The light guide plate as claimed in claim 6, wherein said plurality of light-guiding structures include a plurality of small light-guiding structures disposed at parts of said plate body where the amount of the source light beams provided by the light source impinging thereupon is large, and a plurality of large light-guiding structures sized larger than said small light-guiding structures, and disposed at parts of said plate body where the amount of the source light beams impinging thereupon is small.

11. The light guide plate as claimed in claim 6, wherein said lower end of each of said light-guiding structures is rhombus shaped.

* * * * *